United States Patent Office 3,197,418
Patented July 27, 1965

3,197,418
METHOD FOR PRODUCING COPPER-CONTAINING HYDROGENATION CATALYSTS
Kazutomo Maebashi and Motokazu Yano, Tokyo, Japan, assignors to Asahidenka Kogyo Kabushiki Kaisha, Tokyo, Japan, a corporation of Japan
No Drawing. Filed Feb. 26, 1964, Ser. No. 347,343
Claims priority, application Japan, Feb. 2, 1959, 34/3,029
8 Claims. (Cl. 252—454)

This application is a continuation-in-part of our copending application Serial No. 4,231, filed January 25, 1960, now abandoned.

This invention relates to a process for producing copper-containing catalysts suitable for the selective hydrogenation of oils and fats.

The catalytic behavior and function of copper catalysts in hydrogenation have been studied for a long time by many investigators and a number of publications have been made concerning methods for producing such catalysts.

When the proposed catalysts are compared with each other in regard to their catalytic activity for selective hydrogenation purposes, it can be said that the most active is Adkins' catalyst. Difficulties are encountered, however, in obtaining uniform activity of the said catalyst. Only selected catalysts having the highest level of the activity can be used for selective hydrogenation of oils and fats. This is because, in such hydrogenation, there are presumably more opportunities for the catalyst to be poisoned due to the inherent conditions of selective hydrogenation, e.g., low hydrogen pressure, a greater amount of impurities in the material being hydrogenated, etc., than in other types of hydrogenation, and these conditions impose severe requirements in regard to the uniformity and life of the catalyst used. Thus, it is important to improve the characteristics of catalysts for carrying out selective hydrogenation commercially and successfully.

An object of this invention is to provide a method for producing copper-containing hydrogenation catalysts which are comparable to Adkins' catalyst and which have high and uniform activity as well as a long useful catalytic life without impairing the inherent characteristics of copper itself for hydrogenation purposes.

According to the present invention a copper-containing hydrogenation catalyst is produced by a process which consists essentially of reacting an aqueous acidic solution with an aqueous alkaline solution, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba and metals of Group VIII of the Mendeléeff Periodic Table, the mol ratio of said second metal to copper in said acidic solution being between 1:100 and 70:30. It is preferable to keep the mol ratio of nickel to copper between 1:100 to 5:95. It is of critical importance in the invention that said acidic and alkaline solution be reacted by adding them simultaneously to a third aqueous solution having a pH of between 7 and 11 to form a combined precipitate, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction. After the reaction is completed the precipitate is washed with water to remove the alkali therefrom and then same is dried, whereby an alkali-free, hydrogenation catalyst is obtained. It is preferable to carry out the reaction at an elevated temperature, such as 60 degrees to 90 degrees centigrade.

The catalyst produced by the process of this invention is particularly, although not exclusively, suitable for the selective hydrogenation of oils and fats.

The following Table I is a comparison between catalysts prepared according to the present invention and catalysts prepared according to the prior art methods.

TABLE I.—HYDROGENATION OF REFINED FINBACK WHALE OIL

| | | Amount of the catalyst-percent by weight of the oil | | Iodine Number of hydrogenated oil at selected times during the hydrogenation | | | | |
|---|---|---|---|---|---|---|---|---|
| No. | Type of catalyst | Percent based on weight of catalyst | Percent based on weight of metal [1] | 1 hr. | 2 hrs. | 3 hrs. | 4 hrs. | 5 hrs. |
| 1 | Copper | 5.0 | 2.4 | 104.2 | 92.1 | 83.5 | 78.4 | 78.2 |
| 2 | Adkins | 2.0 | 2.0 | 78.5 | 71.8 | 69.5 | 69.2 | 69.1 |
| 3 | Copper-chromium | 10.0 | 10.0 | 85.4 | 79.5 | 78.6 | 78.0 | 77.8 |
| 4 | Copper-chromium (1:1) [2] | 5.0 | 2.5 | 84.8 | 81.0 | 78.2 | 77.5 | 77.4 |
| 5 | Copper-chromium (1:1) [2] | 1.5 | 0.8 | 80.4 | 72.1 | 71.5 | 69.3 | 69.1 |
| 6 | Copper-chromium (9:1) [2] | 1.5 | 0.8 | 79.0 | 81.2 | 70.5 | 69.1 | 69.1 |
| 7 | Copper-aluminum (1:1) [2] | 1.5 | 0.8 | 81.5 | 72.4 | 71.1 | 69.8 | 69.6 |
| 8 | Copper-zinc (8:2) [2] | 1.5 | 0.8 | 87.4 | 76.8 | 74.0 | 70.5 | 70.1 |

Notes:
(1) Hydrogenation Conditions: In all cases, refined finback whale oil of Acid Number 0.21 and Iodine Number 108.9 was hydrogenated at temperatures between 190 degrees and 200 degrees centigrade under normal hydrogen pressure.
(2) [1] Roughly estimated as metal oxide.
(3) [2] Figures in the parentheses indicate the mol ratio between the metals.

Catalyst No. 1 was prepared according to the well-known method described at page 24 or 36, Vol. 68 (1948) of the Journal of the Pharmaceutical Society of Japan. Catalyst No. 2 was prepared according to the method described at page 878, Vol. 26 (1934) of Industrial and Engineering Chemistry. The fundamental principle of selective hydrogenation of oils and fats is to hydrogenate and convert polyunsaturated constituents to monounsaturated constituents without causing any hydrogenation of the previously existing monounsaturated constituents. From theoretical considerations, the limit of selective hydrogenation of finback whale oil is between 69 and 70, expressed as Iodine Number. From an examination of Table I, it can be seen that the most active catalyst is Adkins' catalyst and the results show that the Iodine Number of the hydrogenated oil decreases rapidly and finally meets the theoretical value when it is used. On the other hand, the catalysts produced by prior art methods exemplified in Nos. 1, 3 and 4 in Table I and comprising copper alone or binary catalysts of copper and chromium show less catalytic activity as illustrated by the data showing their incomplete effect in decreasing the Iodine Number of the hydrogenated oil. In addition, practically no difference in catalytic activity is observed between the catalyst No. 1 comprised of copper alone and the binary catalysts Nos. 3 and 4 comprised of copper and chromium.

Catalysts Nos. 5 to 8 are the catalysts made according to the invention described above and further described hereinafter and, manifestly, these catalysts are highly active and have a long life.

Generally, the active portion of the copper-containing catalysts 1–8 is obtained as a precipitate, which may or may not be adhered to diatomaceous earth or other carriers, by reacting two kinds of solutions, one a solution (hereinafter referred to as the A solution) which is acidic and contains copper ions alone or copper and second metal ion(s) and the other an alkaline solution (hereinafter referred to as the B solution).

Catalyst No. 3 was made by reacting the A and B solutions by pouring the A solution into the B solution. From experimental observations like those listed above, it has been understood that the principal effect of selective hydrogenation is given by the copper alone and the second metals, such as chromium and others, merely serve as carriers for the copper.

We have discovered highly useful improvements of critical importance in the method of producing copper binary catalysts by precipitation, one of which is to control the reaction conditions so as to keep the pH of the reaction mixture between $x-0.5$ and $x+0.5$ (wherein $x$ is from 7 to 11) throughout the entire duration of the reaction. A further critical and chief feature of this invention is more specifically described by the following. When a solution containing copper and second metal ions is reacted with an alkali solution to produce a co-precipitate, which is either adhered to diatomaceous earth or not adhered to any carrier, the essential step in carrying out the invention is to simultaneously add both the A and B solutions to a third liquid, such as water, which is strongly agitated and whose pH is adjusted before addition of the A and B solutions to between 7 to 11 and is maintained during and after the reaction in the range of $x-0.5$ and $x+0.5$, wherein $x$ is from 7 to 11, by controlling the rate of adding both the A and the B solutions. The precipitate formed by thus reacting the solutions is washed with water until no or very little indication of alkali is observed in the filtrate of the washings, then it is dried and pulverized, if necessary, and utilized as the catalyst. No harm is observed in the activity of the produced catalyst by converting the precipitate to oxide form, either by blowing air into the reaction solution containing the precipitates suspended therein or by boiling the reaction solution with its pH being maintained between 8 and 11, or by roasting the washed and dried precipitate at a temperature below 350 degrees centigrade. In order to adhere the pricipitate to a carrier, the carrier may be suspended, before the reaction takes place, in either the solution containing metallic ions (A solution), the alkali solution (B solution), or the third liquid, such as water whose pH has previously been adjusted to a value between 7 and 11.

Another feature of the invention, in addition to the above-described features, is concerned with the second metal used to form the co-precipitates with copper.

The second metal of the present invention is selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba, and metals of Group VIII of the Mendeléeff Periodic Table. The ratio of these second metals to copper should be more than 1:100 expressed in mols and if this mol ratio becomes less than 70:30, the activity of the catalyst gradually decreases.

In case a metal having the inherent property to hydrogenate oil and fat, such as nickel, is combined with copper, the mol ratio thereof to copper should be less than 5:95 and should be more than 1:100. The following are examples illustrating the invention:

Example 1

A solution containing 6.35 g. of cupric ion and 5.20 g. of chromic ion was prepared as the A solution by dissolving their sulfates in 100 ml. of water. The B solution was prepared by dissolving 29 g. of sodium carbonate in 120 ml. of water. 10 g. of diatomaceous earth were suspended in 200 ml. of water, which suspension was heated and held at 70–80 degrees centigrade and then the pH was adjusted to 9 using caustic soda solution. The A and B solutions were simultaneously added to the above hot suspension in such a manner as to keep the pH of the suspension between 8.5 and 9.5. After the reaction was completed, the produced precipitate was filtered and washed with water until the filtrate became slightly alkaline or neutral, then the filter cake was dried and pulverized. This product was the catalyst No. 5 in Table I.

As a comparison for the above-described method, catalyst No. 4 was prepared by pouring the A solution into the B solution, which was held previously at 70–80 degrees centigrade and which contained 10 g. of diatomaceous earth suspended therein. Then, the resulting precipitate was washed until neutral, dried and pulverized.

Example 2

A solution containing 5.72 g. of cupric ion and 0.52 g. of chromic ion, was prepared by dissolving their sulfates in 60 ml. of water. This formed the A solution. A 20% sodium carbonate solution was prepared as the B solution. Separate from the A and B solutions, 5 g. of diatomaceous earth were suspended in 100 ml. of water and the pH of this suspension was adjusted to 8. Next the suspension was vigorously agitated, then the A and B solutions were simultaneously added to the suspension so that the neutralization reaction was kept at a pH of between 8.5 and 9.5. The produced precipitate was filtered and washed, then dried and pulverized. The catalyst thus obtained was catalyst No. 6 in Table I.

Example 3

60 ml. of an aqueous solution, containing 6.35 g. of cupric ion and 2.70 g. of aluminum ion dissolved from their sulfates was prepared as the A solution. An aqueous sodium carbonate solution of 20% concentration was prepared as the B solution. The remainder of the procedure was carried out exactly as in Example 2, and catalyst No. 7 was obtained.

Example 4

60 ml. of an aqueous solution, containing 5.09 g. of cupric ion and 1.31 g. of zinc ion dissolved from ther sulfates, was prepared as the A solution, and a 20% aqueous solution of sodium carbonate was prepared as the B solution. The remainder of the procedure was carried out exactly as in Example 2, and the catalyst No. 8 was obtained.

Example 5

Catalyst No. 5, prepared as in Example 1, was roasted at 250 degrees centigrade for 30 minutes, then cooled and catalyst No. 9 was thus obtained.

Example 6

The procedures of Example No. 2 and then Example No. 5 were followed and catalyst No. 10 was obtained.

Thus, the features of the invention are simple, yet they bring about far better products when compared with products of already known processes wherein the A solution is neutralized with B solution or the A and B solutions are mixed without any specification whatsoever concerning the manner of carrying out the reaction steps or the conditions under which they are reacted. It is thought, as the reason for the highly stabilized catalytic activity of catalysts made by the method of the present invention, that the above-described steps of the invention bring the copper and combining metal precipitate into a more intimately combined state and structure, which has not been possible with the prior art processes and this characteristic combination and structure improves the catalytic activity of the catalyst for hydrogenation purposes.

The catalytic function of catalysts produced by the invention is somewhat different than that of the simple copper catalysts. This is derived from the fact that there is only a very slight increase in the amount of solid fatty acids, particularly, iso-oleic acid, in oil and fat hydrogenated by catalysts produced according to the invention. However, the hydrogenated oil and fats are satisfactory for industrial purposes as shown in Table II.

of Adkins' catalyst. Moreover, advantages can be attained in commercial applications because a lesser amount of metal oxide is sufficient to obtain the same results as when using Adkins' catalyst, which fact is hereinbefore illustrated in Table I.

Table III shows the results achieved by catalysts prepared according to the present invention for the production of a fatty alcohol in comparison with the results achieved by Adkins' catalyst.

TABLE III.—HIGH PRESSURE HYDROGENATION OF COCONUT OIL FATTY ACID ESTER TO PRODUCE A FATTY ALCOHOL

| No. | Catalyst | Amount of the Catalyst | | | Products | | |
|---|---|---|---|---|---|---|---|
| | | Percent as the Catalyst | Percent as the Metal Oxide | Time required for hydrogenation | Acid Number | Saponification Number | Acetyl Number |
| 1 | Adkins | 6 | 6 | ⅔ hr | 0.46 | 13.1 | 207 |
| 2 | Copper-Chromium (1:1)+₁+₂ | 6 | 3.5 | ⅚ hr | 0.38 | 9.3 | 210 |
| 3 | Copper-Chromium (9:1)+₁+₂ | 6 | 3.5 | ⅚ hr | 0.41 | 10.2 | 208 |

Notes:
(1) Methyl Ester of Coconut Oil Fatty Acid:
Acid Number 0.58, Saponification Number 250, Iodine Number 9.46.
(2) Hydrogenation Condition: In all cases initial hydrogen pressure at room temperature was 120 Kg/cm² and the maximum reaction temperature was kept at 320 degrees centigrade.
(3) +₁: Figures in the parentheses indicate the mol ratio between the metals.
(4) +₂: Catalysts are produced as described in Examples 5 and 6, catalysts No. 9 and No. 10, respectively.

TABLE II.—SOLID FATTY ACID CONTENT IN HYDROGENATED FINBACK WHALE OIL

| No. | Catalysts | Iodine Number | Solid fatty acid, percent | Iso-oleic acid, percent |
|---|---|---|---|---|
| 1 | Copper | 78.2 | 17.5 | 4.9 |
| 2 | Adkins | 69.1 | 17.6 | 8.0 |
| 3 | Copper-chromium | 77.8 | 17.7 | 5.4 |
| 4 | Copper-chromium | 77.4 | 17.8 | 6.1 |
| 5 | Copper-chromium | 69.1 | 18.1 | 9.0 |
| 6 | Copper-chromium | 69.1 | 18.1 | 8.8 |
| 7 | Copper-chromium | 69.6 | 18.9 | 8.4 |
| 8 | Copper-zinc | 70.1 | 18.2 | 8.2 |

When catalysts prepared according to the invention are used for purposes other than selective hydrogenation of oils and fats, the catalytic activity compares well with that

Example 7

An A solution was prepared by dissolving 4.2 g. of $Cu(NO_3)_2 \cdot 3H_2O$ and 1 g. of $H_2PtCl_6$ in 50 ml. of water. The B solution was a 10% sodium carbonate solution. 6.3 g. of diatomaceous earth were suspended in 100 ml. of water, and obtained suspension was heated and held at 70–80 degrees centigrade and then the pH was adjusted to 8.5 using the B solution. The A and B solutions were simultaneously added to the above hot suspension in such a manner as to keep the pH of the suspension between 8.0 and 9.0 throughout the entire body of the reaction mixture and for the entire duration of the reaction.

After the reaction was completed, the produced precipitate was filtered and washed with water until the filtrate became neutral and chloride ion free, then the filter cake was dried and pulverized. This product was the catalyst No. 11 in Table IV.

Example 8

An A solution was prepared by dissolving 6.04 g. of cupric ion and 0.29 g. of nickel ion in the form of their sulfates in 100 ml. of water. The B solution was 10% sodium carbonate. 6.3 g. of diatomaceous earth were suspended in 100 ml. of water, and the obtained suspension was heated and held at 70–80 degrees centigrade and then the pH was adjusted to 9.0. The A and B solutions were simultaneously added to the above hot suspension in such a manner as to keep the pH of the suspension between 8.5 and 9.5 throughout the entire duration of the reaction and entire body of the reaction mixture. After the reaction was completed, the produced precipitate was filtered and washed with water until the filtrate became neutral, then the filter cake was dried and pulverized. This product was the catalyst No. 12 in Table IV.

Example 9

An A solution was prepared by dissolving 4.42 g. of $CuSO_4 \cdot 5H_2O$ and 0.50 g. of $OSO_4$ in 34 ml. of water. The B solution was prepared by dissolving 2.71 g. of sodium nitrate in 34 ml. of 10% sodium carbonate. 1.49 g. of diatomaceous earth were dispersed in 100 ml.

of water, and obtained suspension was heated and held at 70–80 degrees centigrade and then the pH of the suspension was adjusted to 8.5 by using sodium carbonate. The A and B solutions were simultaneously added to the above hot suspension in such a manner as to keep the pH of the reaction mixture between 8.0 and 9.0 throughout the entire body of the reaction mixture and entire duration of the reaction. After the reaction was completed, the produced precipitate was filtered and washed with water until the filtrate became nitrate and sulfate ion free, then the filter cake was stored in ethanol. This product was the catalyst No. 13 in Table IV.

to 110 degrees centigrade for 3 hours, and then pulverized. The obtained powder was catalyst No. 14.

Example 11

An A solution was prepared by mixing 180 ml. of copper sulfate solution and 60 ml. of chromium sulfate solution. The copper sulfate solution was prepared by dissolving 249.7 g. of copper sulfate ($CuSO_4.5H_2O$) in 1,000 ml. of water and the chromium sulfate solution was prepared by dissolving 358.3 g. of chromium sulfate ($Cr_2(SO_4)_3.18H_2O$) in 1,000 ml. of water The B solution was the same as for Examples 1 and 2.

TABLE IV

| Catalyst No. | Hydrogen-ating Time (hr.) | Iodine Number | Composition of $C_{18}$=fatty acid during hydrogenation | | | |
|---|---|---|---|---|---|---|
| | | | Saturated f.a., percent | Mono-unsat. f.a., percent | Di-unsat. f.a., percent | Trans-isomer, percent |
| 11 | 0 | 112.8 | 4.3 | 26.0 | 69.7 | 0 |
| | 1 | 93.9 | 4.5 | 53.5 | 42.0 | 18.6 |
| | 2 | 79.9 | 4.5 | 70.5 | 25.0 | 28.2 |
| | 3 | 72.0 | 5.0 | 83.0 | 12.0 | 33.8 |
| | 4 | 69.0 | 5.5 | 88.5 | 6.0 | 35.9 |
| | 5 | 66.7 | 6.0 | 91.0 | 3.0 | 36.3 |
| 12 | 0 | 112.3 | 4.3 | 26.0 | 69.7 | 0 |
| | 1 | 87.3 | 4.5 | 55.5 | 40.0 | 15.1 |
| | 2 | 71.0 | 4.5 | 82.0 | 13.4 | 28.1 |
| | 2.5 | 67.0 | 6.0 | 92.0 | 2.0 | 30.0 |
| | 3 | 65.6 | 7.5 | 91.5 | 1.0 | 31.5 |
| 13 | 0 | 112.7 | 4.4 | 29.9 | 65.7 | 0 |
| | 1 | 82.4 | 4.4 | 72.6 | 23.0 | 28.2 |
| | 2 | 70.5 | 4.6 | 85.8 | 9.6 | 38.9 |
| | 3 | 67.1 | 5.0 | 90.1 | 4.9 | 41.8 |
| | 4 | 66.1 | 5.9 | 90.0 | 4.1 | 42.9 |
| | 5 | 64.7 | 5.9 | 90.5 | 3.6 | 41.6 |

Refined cotton seed oil was hydrogenated by using 1 (wt.) percent of hydrogenation catalysts Nos. 11, 12, and 13 at 180 degrees centigrade under atmospheric pressure with hydrogen, and the results are shown in Table IV.

Example 10

An A solution was prepared by mixing 500 ml. of copper sulfate solution and 500 ml. of a chromium sulfate solution. The copper sulfate solution was prepared by dissolving 249.7 g. of copper sulfate ($CuSO_4.5H_2O$) in 1,000 ml. of water, and the chromium sulfate solution was prepared by dissolving 358.3 g. of chromium sulfate ($Cr_2(SO_4)_3.18H_2O$) in 1,000 ml. of water.

The B solution was a 20 percent sodium carbonate ($Na_2CO_3$) solution.

200 ml. of water were heated to 95 degrees centigrade and then the B solution was poured into the water until the pH of the obtained third solution was adjusted to 9.0. Under strong agitation, the A and B solutions preheated to 95 degrees centigrade were then continuously flowed into said third solution at such a rate as to keep the pH of the reaction between 9.0 and 9.2 and the temperature of the reaction mixture at 90 degrees to 95 degrees centigrade. The reaction mixture was stirred for 15 minutes at 90 degrees to 95 degrees centigrade and then allowed to settle.

The mother liquid was taken off by decantation and the precipitate was washed with hot water (80° to 90° C.) until the washings became negative to phenolphthalein. The precipitate was filtered and the obtained filter cake was dried in an air oven kept at 105 degrees Exactly the same procedure as used for the preparation of catalyst No. 14 (Example 7) was followed and the obtained powder was catalyst No. 15.

Table V shows the results achieved by catalysts No. 14 and No. 15. A refined and deodorized cotton seed salad oil was used as the oil to be hydrogenated. The oil had an Iodine Value 111.5, Saponification Value 195.6 and Acid Value 0.22.

TABLE V.—CHANGE OF IODINE NUMBER BY HYDROGENATION

| Catalyst No. | 14 | 15 |
|---|---|---|
| Cu/Cr Ratio | 1/1 | 3/1 |
| Amount of Catalyst (percent by weight based on weight of oil) | 1 | 2 |
| 0 (at 200° C.) | 109.2 | 108.0 |
| 0.5 | 96.3 | 99.1 |
| 1 | 87.4 | 86.6 |
| Time (hr): | | |
| 2 | 77.6 | 71.9 |
| 3 | 71.8 | 67.2 |
| 4 | 68.7 | 65.1 |

Note: Hydrogenation Condition: Reaction temperature was kept at from 195 to 205 degrees centigrade and reaction pressure was atmospheric pressure.

Example 12

Table VI shows the examples of preparations of various copper binary catalysts of this invention according to the same procedure illustrated in Example 1, and the results of hydrogenations of cotton seed oil using these catalysts at 200 degrees centigrade and under normal hydrogen pressure.

TABLE VI.—PREPARATIONS OF VARIOUS COPPER BINARY CATALYSTS AND HYDROGENATIONS OF COTTON SEED OIL THEREBY

| Catalyst No. | A Solution | | | | | B Solution | |
|---|---|---|---|---|---|---|---|
| | Cu-Salt | | Second Metal Salt | | Water (ml.) | Alkali | Concentration percent |
| | Formula | Wt. (g.) | Formula | Wt. (g.) | | | |
| 16 | $Cu(NO_3)_2 \cdot 3H_2O$ | 21.7 | $AgNO_3$ | 1.70 | 100 | $Na_2CO_3$ | 20 |
| 17 | $Cu(NO_3)_2 \cdot 3H_2O$ | 21.7 | $Cd(NO_3)_2 \cdot 4H_2O$ | 3.08 | 100 | $Na_2CO_3$ | 20 |
| 18 | $Cu(NO_3)_2 \cdot 3H_2O$ | 21.7 | $Sc(NO_3)_3$ | 2.31 | 100 | $Na_2CO_3$ | 20 |
| 19 | $Cu(NO_3)_2 \cdot 3H_2O$ | 21.7 | $Y(NO_3)_3 \cdot 6H_2O$ | 3.83 | 100 | $Na_2CO_3$ | 20 |
| 20 | $Cu(NO_3)_2 \cdot 3H_2O$ | 21.7 | $La(NO_3)_3 \cdot 6H_2O$ | 4.33 | 100 | $Na_2CO_3$ | 20 |
| 21 | $Cu(NO_3)_2 \cdot 3H_2O$ | 21.7 | $Ce(NO_3)_4$ | 3.88 | 100 | $Na_2CO_3$ | 20 |
| 22 | $CuSO_4 \cdot 5H_2O$ | 22.4 | $Ga_2(SO_4)_3 \cdot 18H_2O$ | 7.52 | 100 | $Na_2CO_3$ | 20 |
| 23 | $Cu(NO_3)_2 \cdot 3H_2O$ | 21.7 | $In(NO_3)_3 \cdot 3H_2O$ | 3.55 | 100 | $Na_2CO_3$ | 20 |
| 24 | $CuSO_4 \cdot 5H_2O$ | 22.4 | $Ti(SO_4)_2$ | 2.40 | 100 | $Na_2CO_3$ | 20 |
| 25 | $CuSO_4 \cdot 5H_2O$ | 22.4 | $Zr(SO_4)_2 \cdot 4H_2O$ | 3.55 | 100 | $Na_2CO_3$ | 20 |
| 26 | $CuSO_4 \cdot 5H_2O$ | 22.4 | $Hf(SO_4)_2$ | 3.71 | 100 | $NaOH$ | 10 |
| 27 | $CuSO_4 \cdot 5H_2O$ | 22.4 | $SiCl_4$ | 1.70 | 100 | $Na_2CO_3$ | 20 |
| 28 | $Cu(NO_3)_2 \cdot 3H_2O$ | 21.7 | $SnCl_4 \cdot 5H_2O$ | 3.51 | 100 | $Na_2CO_3$ | 20 |
| 29 | $CuSO_4 \cdot 5H_2O$ | 22.4 | $VOSO_4 \cdot 2H_2O$ | 1.99 | 100 | $NaOH$ | 10 |
| 30 | $CuSO_4 \cdot 5H_2O$ | 22.4 | $K_2WO_4$ | 3.26 | 100 | $Na_2CO_3$ | 20 |
| 31 | $CuSO_4 \cdot 5H_2O$ | 22.4 | $MnSO_4 \cdot 4H_2O$ | 2.23 | 100 | $Na_2CO_3$ | 20 |
| 32 | $CuSO_4 \cdot 5H_2O$ | 24.7 | $FeSO_4 \cdot 7H_2O$ | 0.28 | 100 | $Na_2CO_3$ | 20 |
| 33 | $Cu(NO_3)_2 \cdot 3H_2O$ | 23.9 | $Co(NO_3)_2 \cdot 6H_2O$ | 0.29 | 100 | $Na_2CO_3$ | 20 |
| 34 | $Cu(NO_3)_2 \cdot 3H_2O$ | 23.9 | $Ni(NO_3)_2 \cdot 6H_2O$ | 0.29 | 100 | $Na_2CO_3$ | 20 |
| 35 | $CuCl_2 \cdot 2H_2O$ | 16.9 | $RuCl_3$ | 0.21 | 100 | $Na_2CO_3$ | 20 |
| 36 | $CuCl_2 \cdot 2H_2O$ | 16.9 | $RhCl_3 \cdot 4H_2O$ | 0.28 | 100 | $NaOH$ | 10 |
| 37 | $Cu(NO_3)_2 \cdot 3H_2O$ | 23.9 | $PdCl_2 \cdot 2H_2O$ | 0.21 | 100 | $Na_2CO_3$ | 20 |
| 38 | $Cu(NO_3)_2 \cdot 3H_2O$ | 23.9 | $OsCl_4$ | 0.33 | 100 | $Na_2CO_3$ | 20 |
| 39 | $Cu(NO_3)_2 \cdot 3H_2O$ | 23.9 | $IrCl_4$ | 0.33 | 100 | $Na_2CO_3$ | 20 |
| 40 | $Cu(NO_3)_2 \cdot 3H_2O$ | 4.2 | $H_2PtCl_6 \cdot 6H_2O$ | 1.00 | 50 | $Na_2CO_3$ | 10 |
| 41 | $Cu(NO_3)_2 \cdot 3H_2O$ | 21.7 | $Be(NO_3)_2 \cdot 3H_2O$ | 1.87 | 100 | $NaOH$ | 10 |
| 42 | $Cu(NO_3)_2 \cdot 3H_2O$ | 21.7 | $Mg(NO_3)_2 \cdot 6H_2O$ | 2.56 | 100 | $KOH$ | 10 |
| 43 | $Cu(NO_3)_2 \cdot 3H_2O$ | 21.7 | $Ca(NO_3)_2 \cdot 4H_2O$ | 2.36 | 100 | $NaOH$ | 10 |
| 44 | $Cu(NO_3)_2 \cdot 3H_2O$ | 21.7 | $Sr(NO_3)_2$ | 2.12 | 100 | $KOH$ | 10 |
| 45 | $Cu(NO_3)_2 \cdot 3H_2O$ | 21.7 | $Ba(NO_3)_2$ | 2.61 | 100 | $Na_2CO_3$ | 20 |
| 46 | $Cu(NO_3)_2 \cdot 3H_2O$ | 21.7 | $Na_2MoO_4$ | 2.06 | 100 | $\{NaOH$ / $Ca(OH)_2\}$ | 10 / 0.2 |

Table VII shows typical examples of fatty acid composition of $C_{18}$ acids in the hydrogenated cotton seed oil during hydrogenation using several of the catalysts shown in Table VI.

TABLE VI.—PREPARATIONS OF VARIOUS COPPER BINARY CATALYSTS AND HYDROGENATIONS OF COTTON SEED OIL THEREBY

| Catalyst No. | Third Solution | | Hydrogenation at 200° C. and under normal hydrogen pressure | | | | | |
|---|---|---|---|---|---|---|---|---|
| | Temp. (° C.) | pH | Amount of the catalyst Percent by Wt. of the Oil | Iodine No. of hydrogenated cottonseed oil at selected times during the hydrogenation | | | | |
| | | | | 1 hr. | 2 hrs. | 3 hrs. | 4 hrs. | 5 hrs. |
| 16 | 70 | 9.0±0.5 | 2.0 | 106.8 | 99.9 | 92.9 | 88.4 | 84.2 |
| 17 | 70 | 10.0±0.5 | 2.0 | 108.0 | 101.3 | 95.3 | 90.7 | 86.5 |
| 18 | 70 | 9.0±0.5 | 2.0 | 92.5 | 81.3 | 75.1 | 71.0 | 69.8 |
| 19 | 70 | 9.0±0.5 | 2.0 | 100.9 | 86.3 | 80.8 | 75.4 | 72.3 |
| 20 | 70 | 9.0±0.5 | 2.0 | 91.6 | 80.1 | 75.4 | 72.5 | 70.1 |
| 21 | 70 | 9.0±0.5 | 2.0 | 100.9 | 80.3 | 70.4 | 67.1 | 66.1 |
| 22 | 70 | 9.0±0.5 | 2.0 | 84.5 | 72.0 | 68.6 | 66.1 | 65.8 |
| 23 | 70 | 9.0±0.5 | 2.0 | 96.8 | 88.2 | 82.6 | 78.5 | 76.3 |
| 24 | 80 | 9.0±0.5 | 2.0 | 103.2 | 95.6 | 87.8 | 83.2 | 81.8 |
| 25 | 70 | 9.0±0.5 | 2.0 | 90.8 | 80.8 | 73.5 | 70.9 | 68.6 |
| 26 | 70 | 7.0±0.5 | 2.0 | 103.1 | 95.1 | 88.3 | 84.4 | 82.4 |
| 27 | 70 | 9.0±0.5 | 2.0 | 95.3 | 85.3 | 80.2 | 77.8 | 75.6 |
| 28 | 70 | 9.0±0.5 | 2.0 | 98.8 | 90.8 | 85.5 | 82.5 | 80.2 |
| 29 | 70 | 9.0±0.5 | 2.0 | 106.1 | 99.9 | 94.4 | 89.2 | 85.3 |
| 30 | 70 | 9.0±0.5 | 2.0 | 93.2 | 84.8 | 80.4 | 77.2 | 74.8 |
| 31 | 70 | 9.0±0.5 | 2.0 | 94.0 | 87.3 | 83.6 | 81.4 | 79.2 |
| 32 | 70 | 9.0±0.5 | 2.0 | 90.2 | 81.1 | 76.3 | 72.9 | 70.8 |
| 33 | 70 | 9.0±0.5 | 2.0 | 89.1 | 75.6 | 70.3 | 66.7 | 64.5 |
| 34 | 70 | 9.0±0.5 | 1.0 | 87.3 | 71.0 | 67.0 | 65.6 | |
| 35 | 70 | 9.0±0.5 | 1.0 | 91.7 | 80.5 | 73.2 | 69.8 | 66.4 |
| 36 | 80 | 9.0±0.5 | 1.0 | 87.8 | 72.6 | 69.8 | 66.6 | 65.0 |
| 37 | 70 | 9.0±0.5 | 1.0 | 84.3 | 71.5 | 68.6 | 67.1 | 65.4 |
| 38 | 70 | 9.0±0.5 | 1.0 | 83.4 | 70.5 | 67.7 | 66.4 | 64.7 |
| 39 | 70 | 9.0±0.5 | 1.0 | 91.0 | 78.5 | 73.0 | 69.9 | 67.2 |
| 40 | 80 | 9.0±0.5 | 1.0 | 93.9 | 79.9 | 72.0 | 69.0 | 66.7 |
| 41 | 80 | 10.0±0.5 | 2.0 | 91.2 | 80.3 | 75.7 | 73.2 | 71.0 |
| 42 | 80 | 10.0±0.5 | 2.0 | 83.5 | 70.0 | 66.2 | 64.1 | 64.0 |
| 43 | 80 | 10.0±0.5 | 2.0 | 99.0 | 84.5 | 77.1 | 73.4 | 71.2 |
| 44 | 80 | 10.0±0.5 | 2.0 | 95.3 | 83.2 | 77.0 | 73.8 | 71.5 |
| 45 | 80 | 10.0±0.5 | 2.0 | 101.1 | 92.1 | 88.0 | 82.7 | 78.3 |
| 46 | 70 | 10.0±0.5 | 2.0 | 90.3 | 81.6 | 75.8 | 73.1 | 71.8 |

TABLE VII.—COMPOSITION OF $C_{18}$ FATTY ACIDS DURING HYDROGENATION

| Cat. No. | Iodine Number | Saturated (Percent) | Monounsaturated (Percent) | Di-unsaturated (Percent) |
|---|---|---|---|---|
| 16 | 106.8 | 3.5 | 31.1 | 65.4 |
|  | 99.9 | 3.3 | 41.5 | 55.2 |
|  | 92.9 | 3.4 | 55.3 | 41.3 |
|  | 88.4 | 3.2 | 61.5 | 35.3 |
|  | 84.2 | 3.1 | 65.8 | 31.1 |
| 21 | 100.9 | 3.4 | 41.6 | 55.0 |
|  | 80.3 | 3.4 | 74.0 | 22.6 |
|  | 70.4 | 3.2 | 83.8 | 13.0 |
|  | 67.1 | 3.4 | 89.6 | 7.0 |
|  | 66.1 | 3.3 | 92.5 | 4.2 |
| 31 | 94.0 | 3.5 | 53.7 | 42.8 |
|  | 87.3 | 3.4 | 62.1 | 34.5 |
|  | 83.6 | 3.4 | 66.4 | 30.2 |
|  | 81.4 | 3.2 | 69.5 | 27.3 |
|  | 79.2 | 3.3 | 72.3 | 24.4 |
| 42 | 83.5 | 3.4 | 65.3 | 31.3 |
|  | 70.0 | 3.3 | 85.1 | 11.6 |
|  | 66.2 | 3.4 | 92.8 | 3.8 |
|  | 64.1 | 3.5 | 94.3 | 2.2 |
|  | 64.0 | 3.3 | 94.6 | 2.1 |

Example 13

For the purpose of showing the unexpected improvements which result from mixing of the A and B solutions with a third solution, whose pH is controlled, the following tests were conducted.

*Preparation of catalyst without using the third solution.*—Catalysts 47 and 49 were prepared by directly mixing together A and B solutions, prepared in accordance with Example 10 and held at 95 degrees centigrade so that the pH of the reaction solution was maintained from 9.0 to 9.2.

Catalyst 47 was prepared from 200 ml. A solution and 250 ml. B solution. Catalyst 49 was prepared from 200 ml. of the A solution diluted with distilled water to 600 ml. and 350 ml. of the B solution diluted to 1400 ml.

Catalysts 51 and 53 were prepared by directly mixing together A and B solutions prepared in accordance with Example 11 held at 95 degrees so that the pH of the reaction solution was maintained at from 9.0 to 9.2. Catalysts 51 and 53 were prepared from 320 ml. of the A solution and 250 ml. of the B solution. After washing and drying, 10 ml. of distilled water were mixed with sodium hydroxide (20 mg. calculated as $K_2O$) and such was mixed with 5 g. of catalyst 53.

*Preparation of catalyst using the third solution.*—Catalysts 48 and 50 were prepared from the same solutions as catalysts 47 and 49, respectively. The sole difference was that the A and B solutions were added to a third solution consisting of distilled water to which B solution was added until the third solution had a pH of 9. Then the A and B solutions were simultaneously added to the third solution.

Catalyst 52 was prepared from the same solutions as catalyst 51 but following the same procedures as for catalysts 48 and 50.

Catalysts 47–52 all were washed with distilled water until they became negative to phenolphthalein.

*Hydrogenation using Catalysts 47–53.*

A refined and deodorized cottonseed salad oil having an Iodine Value of 111.5, Saponification Value of 195.6 and an Acid Value of 0.22. The hydrogenation temperature was from 195 to 205 degrees centigrade.

The following table lists the results.

Catalysts No. 47 and No. 48, No. 49 and No. 50, and No. 51 and No. 52 are directly comparable because the same solutions were used and only the mixing methods were different. In each case the catalysts made using the third solution (Nos. 48, 50 and 52) are unexpectedly more active. Catalyst 53 is inactive for hydrogenating cottonseed oil because it contains alkali.

It is to be understood that the invention is not limited to the specific details of the examples herein described but can be practiced in other ways without departure from the spirit and scope of the invention as defined in the appended claims.

RESULTS OF HYDROGENATION

| Catalyst No | 47 | 48 | 49 | 50 | 51 | 52 | 53 |
|---|---|---|---|---|---|---|---|
| Amount of Catalyst: (Percent by weight based on weight of oil) | 1 | 1 | 1 | 1 | 2 | 2 | 2 |
| Cu/Cr Ratio | 1/1 | 1/1 | 1/1 | 1/1 | 3/1 | 3/1 | 3/1 |
| Alkali | Free | Free | Free | Free | Free | Free | [1] Added |
| Hydrogenation (Figures in Iodine Value): | | | | | | | |
| Initial at 200° C | 109.9 | 109.2 | 110.8 | 110.4 | 110.6 | 108.0 | 110.1 |
| 30 min | 98.9 | 96.3 | 101.3 | 97.5 | 101.5 | 99.1 | 110.0 |
| 1 hr | 92.3 | 87.4 | 94.2 | 89.4 | 89.3 | 86.6 | 110.0 |
| 2 hr | 82.2 | 77.6 | 80.3 | 77.8 | 78.6 | 71.9 | 109.9 |
| 3 hr | 76.2 | 71.8 | 74.1 | 71.4 | 70.3 | 67.2 | 109.9 |
| 4 hr | 72.1 | 68.7 | 70.8 | 68.2 | 67.5 | 65.1 | 109.7 |

[1] (0.4% $K_2O$).

What is claimed is:

1. A process of producing a copper-containing hydrogenation catalyst, which consists essentially of reacting an aqueous acidic solution with an aqueous alkaline solution capable of reacting with the acidic solution to form a coprecipitate of the hereinafter mentioned metals, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba, and metals of Group VIII of the Mendeléeff Periodic Table, the mol ratio of said second metal to copper in said acidic solution being between 1:100 and 70:30, said acidic and alkaline solutions being added simultaneously to an aqueous third solution having a pH between 7 and 11 to form a combined precipitate of said metals, the rate of adding said acidic and alkaline solutions to said third aqueous solution being so regulated as to keep the pH of the reaction mixture between $x-0.4$ and $x+0.5$ (wherein $x$ is from 7 to 11) throughout the entire duration of the reaction, washing the precipitate with water to remove the alkali therefrom and then drying the same, whereby an alkali-free hydrogenation catalyst is obtained.

2. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba and metals of Group VIII of Mendeléeff Periodic Table, the mol ratio of said second metal to copper in said acidic solution being between 1:100 and 70:30, said acidic and alkaline solutions being added simultaneously to an aqueous third solution having a pH between 7 and 11 to form a combined precipitate of said metals, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, the reaction being carried out at 60 degrees to 90 degrees centigrade, washing the precipitate with water to remove the alkali therefrom and then drying the same.

3. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and ions of a second metal selected from the group consisting of zinc, cadmium, aluminum, silicon, titanium, tin, zirconium, vanadium, chrominum molybdenum, tungsten, manganese, Ag, Sc, Y, La, Ce, Ga, In, Hf, Be, Mg, Ca, Sr, Ba and metals of Group VIII of the Mendeléeff Periodic Table, the mol ratio of said second metal to copper in said acidic solution being between 1:100 and 70:30, said acidic and alkaline solutions being added simultaneously to an aqueous third solution having a pH between 7 to 11 to form a combined precipitate of said metals, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, washing the precipitate with water to remove the alkali therefrom and then drying the same, and roasting the same at a temperature below 350 degrees centigrade, whereby an alkali-free hydrogenation catalyst is obtained.

4. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba and metals of Group VIII of the Mendeléeff Periodic Table, the mol ratio of said second metal to copper in said acidic solution being between 1:100 and 70:30, said acidic and alkaline solutions being added simultaneously to an aqueous third solution having a pH between 7 and 11 to form a combined precipitate of said metals, blowing air into the reaction mixture to convert the precipitate to an oxide, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, washing the precipitate with water to remove the alkali therefrom and then drying the same, whereby an alkali-free hydrogenation catalyst is obtained.

5. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba and metals of Group VIII of the Mendeléeff Periodic Table, the mol ratio of said second metal to copper in said acidic solution being between 1:100 and 70:30, said acidic and alkaline solutions being added simultaneously to an aqueous third solution having a pH between 7 and 11 to form a combined precipitate of said metals, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, boiling the reaction mixture after the reaction is completed to convert the precipitate to an oxide, washing the precipitate with water to remove the alkali therefrom and then drying the same, whereby an alkali-free hydrogenation catalyst is obtained.

6. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba and metals of Group III of the Mendeléeff Periodic Table, the mol ratio of said second metal to copper in said acidic solution being between 1:100 and 70:30, said acidic and alkaline solutions being added simultaneously to an aqueous third solution having a pH between 7 and 11 and having an inert carrier suspended therein to form a combined precipitate of said metals, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, washing the precipitate with water to remove the alkali therefrom and then drying the same, whereby an alkali-free hydrogenation catalyst is obtained.

7. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and nickel ions, the mol ratio of nickel to copper in said acidic solution being between 1:100 and 5:95, said acidic and alkaline solutions being added simultaneously to an aqueous third solution having a pH between 7 and 11 to form a combined precipitate of said metals, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, washing the precipitate with water to remove the alkali therefrom and then drying the same, whereby an alkali-free hydrogenation catalyst is obtained.

8. A process of producing a copper-containing catalyst for the hydrogenation of oils and fats, which consists essentially of reacting an aqueous acidic solution with an aqueous alkaline solution containing at least one alkali selected from the group consisting of hydroxides and carbonates of alkali metals and calcium hydroxide and mixtures thereof, said aqueous acidic solution containing copper ions and ions of a second metal selected from the group consisting of zinc, cadmium, aluminum, silicon, titanium, tin, zirconium, vanadium, chromium, molybdenum, tungsten, manganese, Ag, Sc, Y, La, Ce, Ga, In, Hf, Be, Mg, Ca, Sr, Ba and metals of Group VIII of the Mendeléeff Periodic Table, the mol ratio of said second metal to copper in said acidic solution being between 1:100 and 70:30, said acidic and alkaline solutions being added simultaneously to an aqueous third solution having a pH between 7 and 11 to form a combined precipitate of said metals, the rate of adding said acidic and alkaline solutions to said third aqueous solution being so regulated as to keep the pH of the reaction mixture between $x-0.5$ and $x+0.5$ (wherein $x$ is from 7 to 11) throughout the entire duration of the reaction, washing the precipitate with water to remove the alkali therefrom and then drying the same, whereby an alkali-free hydrogenation catalyst is obtained.

References Cited by the Examiner

UNITED STATES PATENTS

| | | | |
|---|---|---|---|
| 2,767,202 | 10/56 | Rottig | 252—476 X |
| 2,874,129 | 2/59 | Bell | 252—454 |
| 2,889,350 | 6/59 | Horny et al. | 252—476 X |
| 2,981,751 | 4/61 | Keith et al. | 252—454 X |
| 3,123,626 | 3/64 | Kirsch | 260—409 |

MAURICE A. BRINDISI, *Primary Examiner.*